(12) United States Patent
Stockmaster

(10) Patent No.: US 6,744,408 B1
(45) Date of Patent: Jun. 1, 2004

(54) ENHANCEMENTS FOR GPS BASED BI-STATIC RADAR

(75) Inventor: Michael H. Stockmaster, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/378,311

(22) Filed: Mar. 4, 2003

(51) Int. Cl.$^7$ ................................................ G01S 3/02
(52) U.S. Cl. ............. 342/453; 342/357.06; 342/357.12; 342/13; 701/213
(58) Field of Search ........................... 342/453, 357.06, 342/357.12, 13; 701/213

(56) References Cited

U.S. PATENT DOCUMENTS

| | | | |
|---|---|---|---|
| 5,187,485 A | 2/1993 | Tsui et al. ................... | 342/35 |
| 6,549,165 B2 | 4/2003 | Neira et al. .................. | 342/462 |

OTHER PUBLICATIONS

Monzingo, Robert A. and Miller, Thomas W., *Introduction to Adaptive Arrays*, © 1980 by John Wiley & Sons, Inc., New York, title page, p. v, and Ch. 5, pps. 216–293.

Stockmaster, Michael H. et al., "Passive Ranging Using the GPS", Proceedings of the Institute of Navigation (ION) GPS, 1998, p. 915.

Choi, Ip Ki et al., "Pseudolites–A New Tool For Surveyors?", pp. 1–9, retrieved from the Internet from www.gmat.unsw.edu.au/snap/publications/choi_etal2000.pdf and dated Aug. 20–26, 2000.

*Primary Examiner*—Theodore M. Blum
(74) *Attorney, Agent, or Firm*—Nathan O. Jensen; Kyle Eppele

(57) ABSTRACT

A bi-static radar system is disclosed. The bi-static radar system comprises a system of positioning signal transmitters transmitting positioning signals, at least one of the positioning system signal transmitters being carried on a pseudolite. The bi-static radar system also comprises a receiving platform, the receiving platform having at least two antennas, a first antenna receiving positioning signals from the positioning signal transmitters, and a second antenna receiving reflected positioning signals from a target.

22 Claims, 5 Drawing Sheets

ENHANCEMENTS FOR GPS BASED BI-STATIC RADAR

BACKGROUND

Many unforeseen applications of GPS have been developed in recent years. One such application is passive ranging using the GPS standard positioning system (GPS-SPS). A method to measure the distance between a given target and an observation point without a GPS receiver at the target or knowing the exact location of the target has been developed and tested. No signal is emitted by the user to find the distance to the target. Only the reception of GPS signals is required. This approach conventionally requires two GPS receivers. One receiver uses a conventional GPS antenna to receive the signals directly from the satellites. The second receiver uses a high gain antenna directed at the target and receives GPS signals reflected from it. The direct GPS receiver determines the positions of the satellites so the distance from the satellites to the user can be determined (and the user position if not known). The second receiver is used to process the reflected signals from the target to measure the total distance from the satellite to the target and the target to the user. Target distances of up to 64.9 meters have conventionally been measured with approximately 1–2 meters of error.

These passive ranging systems include a number of drawbacks including, but not limited to, low signal strength issues, reception of multi-path reflected signals, jamming issues, among others. Accordingly, there is a need for a passive ranging or bi-static radar system which uses GPS pseudolites to overcome any one of or combinations of these issues. There is also a need for using a space-time adaptive processing system in a passive ranging or bi-static radar system to overcome any one of or combinations of these issues.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to a bi-static radar system. The bi-static radar system comprises a system of positioning signal transmitters transmitting positioning signals, at least one of the positioning system signal transmitters being carried on a pseudolite. The bi-static radar system also comprises a receiving platform, the receiving platform having at least two antennas, a first antenna receiving positioning signals from the positioning signal transmitters, and a second antenna receiving reflected positioning signals from a target.

Another example of the invention relates to a bi-static radar system. The bi-static radar system comprises a constellation of satellites having positioning signal transmitters transmitting positioning signals. The bi-static radar system also comprises a receiving platform, the receiving platform having at least two antennas, a first antenna receiving positioning signals from the positioning signal transmitters, and a second antenna receiving reflected positioning signals from a target. The bi-static radar system further comprises a signal processing system coupled to the at least two antennas, the signal processing system using a spatial or array processing algorithm on the signals received by the second antenna.

Yet another example of the invention relates to a passive ranging system. The passive ranging system comprises a system of positioning signal transmitters transmitting positioning signals, at least one of the positioning system signal transmitters being carried on a pseudolite. The passive ranging system also comprises a receiving platform, the receiving platform having at least two antennas, a first antenna receiving positioning signals from the positioning signal transmitters, and a second antenna receiving reflected positioning signals from a target. The passive ranging system further comprises a signal processing system coupled to the at least two antennas, the signal processing system using space-time adaptive processing (STAP) on the signals received by the second antenna.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1:
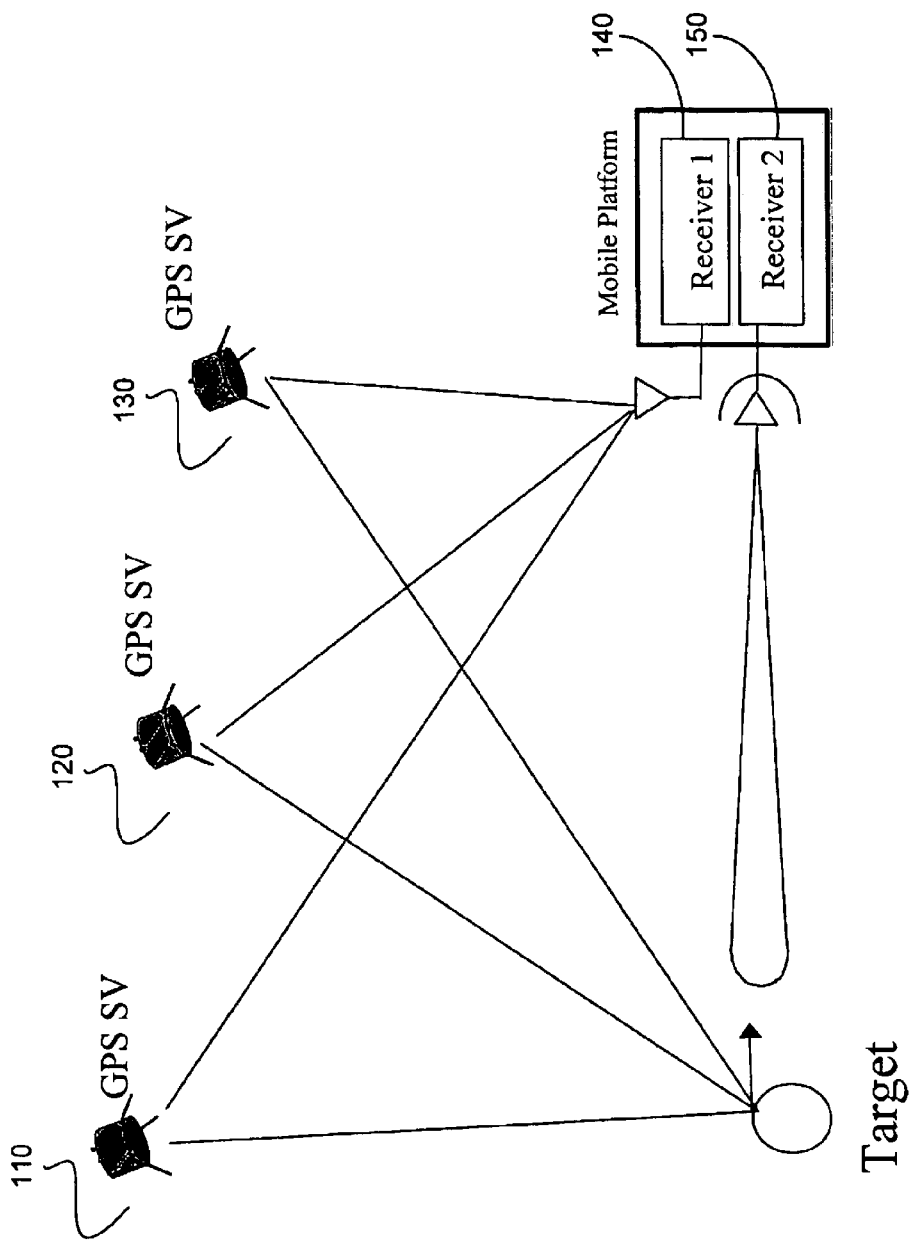
FIG. 1 is an exemplary depiction of a conventional GPS based bi-static radar.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

As described previously, two GPS receivers are needed to provide the appropriate measurements in a bi-static radar system, one with a standard antenna and one with a high gain antenna. The direction of the target must generally be known such that the high gain antenna can be steered appropriately. The arrangement is shown in FIG. 1. In this figure, three satellites 110, 120, and 130 are shown although only one satellite is required to calculate the range Receiver 1 140 is the direct receiver and receiver 2 150 is the reflected receiver.

Figure 2:
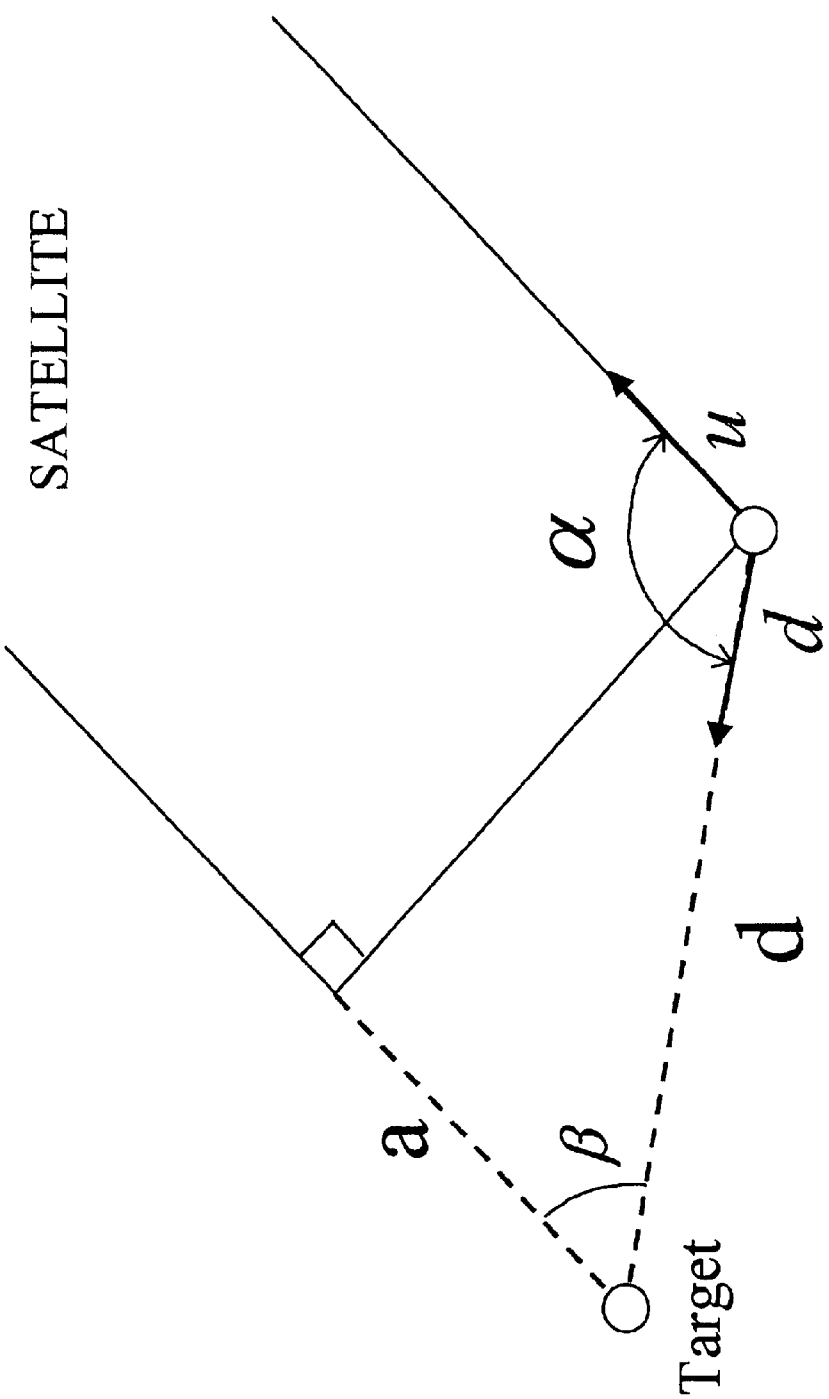
FIG. 2 is an exemplary depiction of geometry used in a bi-static radar solution.

To better illustrate how a measurement is made, the geometry of one satellite, the target and the observation point is depicted in FIG. 2. Since the satellite is far from the target and the observation point, the incident wave from the satellite can be considered parallel.

Figure 3:
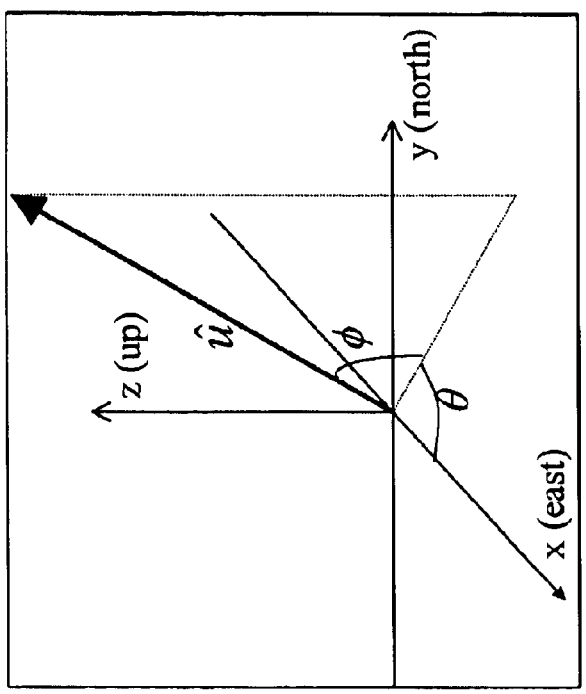
FIG. 3 is another exemplary depiction of geometry used in a bi-static radar solution.

The measured time difference between the two antennas is (a+d) I c where c is the speed of light. The difference in distance between the two channels is m=a+d. However, the distance of interest is d. In order to find d, the angle $\alpha$ must be known. This angle can be determined from two unit vectors: one from the observation point to the satellite (u) and the other from the observation point to the target (d). The angle $\alpha$ can be obtained from vectors u and d by solving the following equation for $\alpha$:

$$\cos \alpha = u \cdot d \quad (1)$$

where·represents dot product. From FIG. 3, the unit vector û can be decomposed as $$\hat{u} = \cos(\phi)\cos(\theta)a_x + \cos(\phi)\sin(\theta)a_y + \sin(\phi)a_z \quad (2)$$

The angle $\phi$ and $\theta$ can be measured from a GPS receiver as it calculates the satellite positions. The unit vector d can be obtained from the direction of the high gain antenna. Once the angle $\alpha$ is obtained, angle $\beta$ can be found from:

$$\beta = 90 - (\alpha - 90) = 180 - \alpha \quad (3)$$

The relation between d and a is $$a = d \cos(\beta) = -d \cos(\alpha) \quad (4)$$

Since m=a+d, the distance d can be obtained as $$m = a + d = d(1 - \cos\alpha) \text{ or } d = \frac{m}{1 - \cos\alpha} \quad (5)$$

The measurement of d has an angle related sensitivity to errors in m. This can be found by differentiating d with respect to m as $$\delta d = \frac{\delta m}{1 - \cos\alpha} \quad (6)$$

When $\alpha$ is close to 180 degrees the accuracy of the measured distance is better. When $\alpha$ is close to 0 degrees, the accuracy can be rather poor. When $\alpha=0$, the error can be infinite. This can provide a basis to select the satellites used to determine the range. If multiple satellites are used to form a single range measurement, the individual measurement could be weighted based on (6). Equation (6) could also be used to determine which satellites to exclude from the range measurement.

When several satellite signals are reflected from the target, the distance can be calculated using a least squares approach. This can be expressed as the following system of equations:

$$m_1 = d(1 - \cos \alpha_1)$$
$$m_2 = d(1 - \cos \alpha_2)$$
$$\ldots$$
$$m_n = d(1 - \cos \alpha_n) \quad (7)$$

In matrix form, the least squares solution can be expressed as $$d = (\Theta^T \Theta)^{-1} \Theta^T M \quad (8)$$

where the superscript T and −1 represent transpose and inverse of a vector respectively; $\Theta$ and M are $$\Theta^T = [1 - \cos \alpha_1, 1 - \cos \alpha_2, \ldots, 1 - \cos \alpha_n]$$

$$M^T = [m_1 m_2 \ldots m_n] \quad (9)$$

Intuitively, one can expect that the result obtained from Equation (9) should be better than Equation (5), because more data are used. However, the location of the satellite should be taken into consideration because satellites in front of the directional antenna could generate larger errors than satellites behind the directional antenna. An approach that weights the different satellites based on (6) could yield better results, e.g. a Kalman filtering approach.

Pseudolites may be used to overcome several limitations of a bi-static GPS radar as well as to extend the available number of range measurements. A pseudolite (PL) is a GPS signal generator and transmitter. Pseudolites may be equipped with additional features to enhance their performance, such as different signal transmitting functions, user defined message formats, etc. Pseudolites may be used to augment traditional GPS systems for anti-jamming functionality. Pseudolites may be located in fixed positions or may be flown on vehicles such as, but not limited to, aircraft and spacecraft. Pseudolites generally are configured to transmit a higher power signal than conventional GPS signals. The use of pseudolites in a bi-static radar system may be used to overcome several issues including:

(1) Signal Strength Issues

It may be difficult to receive the reflected signal from the target in conventional GPS systems. This is due to either a weak reflection from the target due to a poor scattering coefficient or free space loss due to being too far from the target (or both). The result of a weak signal reflection is either the inability of the GPS to track the signal or the measurements produced by tracking the signal are too noisy. The user could be forced to move closer to the target to measure the range, which is obviously undesirable for certain targets.

GPS PLs are used to enhance GPS reception in a well defined area through transmission of GPS-like signals that are transmitted at a higher power than a typical GPS satellite. By replacing the GPS software in a bi-static GPS receiver with PL enabled software, one can take advantage of the increased signal strength of the PL transmissions. PL architectures currently proposed plan on increasing the signal power 20–30 dB above GPS powers. For example, with a 20 dB increase of signal power, the user can either be 10 times further from the target than for a GPS transmission or detect a target with a scattering coefficient 100 times smaller than with a GPS transmission.

(2) Multi-path Issues

To accurately measure the range to a target, the receiver channels must be able to provide accurate pseudorange measurements. One large source of pseudorange error in a likely application of a GPS bi-static radar is multi-path. If a signal from a given satellite is received with multiple reflections from multiple targets, the correlation peak will be biased yielding an incorrect range measurement.

With a PL based bi-static radar, one may be able to control the location of the pseudolites so as to minimize the possibility of undesired multi-path. This is not possible with the GPS constellation.

(3) Jamming Issues

Another source of performance degradation may be jamming. This reduces the signal to noise ratio (SNR) of the signals being tracked. A standard GPS bi-static radar offers no jamming immunity. Since the main application of a bi-static radar may be operating in an electronic warfare environment, immunity to jamming is essential to operation.

The increased PL signal power not only may yield stronger reflections than a GPS signal, but also may provide for jamming immunity on both the reflected and direct antennas. The stronger PL transmission essentially lowers the jamming signal proportional to the signal power increase above GPS transmissions. Relative to a standard GPS based bi-static radar, the user can operate much closer to a target which is very likely to be located in strong jamming. For example, for a 20 dB increase in PL power above GPS power, the user can be 10 times closer to the jammer than with a GPS bi-static radar. This allows the user in many instances to be close enough to the target to measure its range.

By providing the location of targets within a jamming environment, a PL based bi-static radar may provide target tracking (e.g. tanks) using various sensors (e.g. vibration or acoustic sensors). A PL based bistatic radar could be incorporated into or used as a high-end enhancement to such a system.

Figure 4:
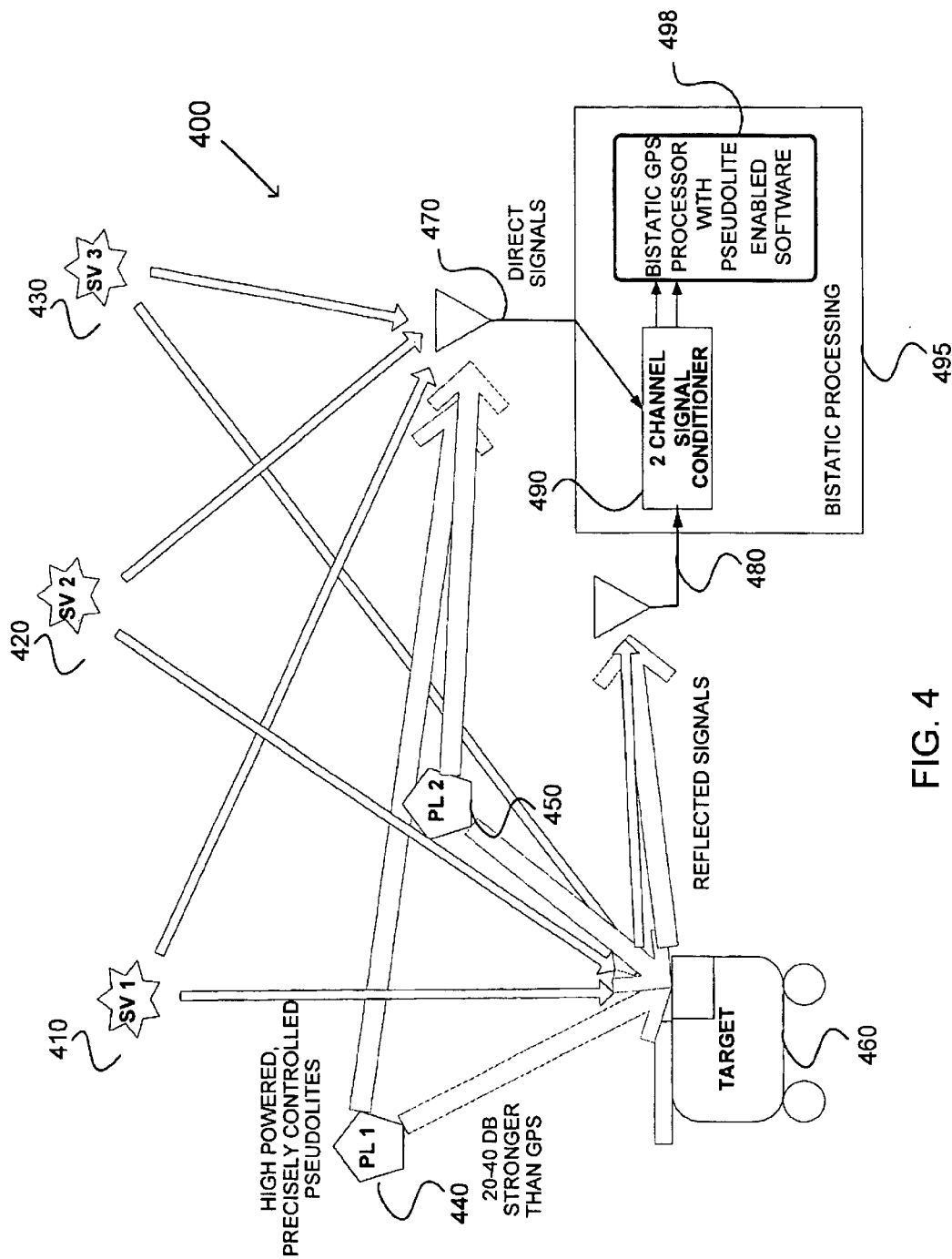
FIG. 4 is an exemplary diagram of a bi-static radar system using pseudolites.

Referring now to FIG. 4, a GPS based bi-static radar system 400 is depicted. Bi-static radar system 400 includes a constellation of GPS satellites 410, 420, and 430. Satellites 410, 420, and 430 provide conventional GPS signals. System 400 also includes pseudolites 440 and 450 which are precisely controlled in location and further provide high powered GPS signals which are stronger than conventional GPS signals. Signals from pseudolites 440 and 450 are reflected off of a target 460 as are signals from satellites 410, 420, and 430. Further, signals from pseudolites 440 and 450, as well as signals from satellites 410, 420, and 430, are all received by a first antenna 470. Reflected signals from target 460 are received by a second antenna 480. These signals from antennas 470 and 480 are communicated to a two-channel signal conditioner 490 within bi-static processing unit 495. Bi-static processing unit 495 also receives signals from the two-channel signal conditioner 490 into a bi-static GPS processor with pseudolite enabled software 498 which is configured to provide for processing of the signals received in order to generate a position of the target of interest. This may be done using conventional techniques which are known for generating target positions in conventional GPS based bi-static radar.

In accordance with an alternative embodiment, space-time adaptive processing (STAP) may be used to overcome several limitations of conventional bi-static GPS radar. Alternatively, other spatial or array processing techniques may be used (e.g. space-frequency adaptive processing, etc.) which provide spatial nulling and/or beam forming functionality. Most of the benefits are achieved by utilizing STAP on the channels that receive the reflected signals, but in the case of jamming, STAP offers improvement on both the direct and reflected channels. The use of STAP, either in a conventional bi-static radar or in a bi-static radar using PLs, as depicted in FIG. 4, move toward solving the following issues which were stated earlier.

(1) Signal Strength Issues

STAP can be used to provide steering gain towards the target. Since the unit vector in the direction of the target is already known for the bi-static radar, this same information can be used to calculate a steering vector for the target. The steering gain is proportional to the number of elements in the antenna array used to receive the reflection off the target. For example, for a 10 element antenna. STAP can improve the signal SNR by 10 dB. Therefore, the user can be 3.3 times further away from the target than with a standard GPS bi-static radar. Alternatively, at the same distance from the target, the user can detect a target with a scattering coefficient 10 times weaker with 10 element STAP relative to a standard GPS bi-static radar. This allows the user to detect a wider variety of targets.

(2) Multi-path Issues

The reception of a direct signal from a satellite will either bias the result or completely prevent the user from being able to receive the reflection from the target. Using a directional (vs. omni-directional) antenna helps, but size limitations eventually limit what can be done.

STAP can be used to not only increase the signal power in a desired direction, but decrease it in undesired directions by controlling the shape of the antenna pattern. By proper choice of the constraining algorithm, significant attenuation can be achieved in the direction of undesired multi-path reflector and direct signals, hence improving the accuracy of the range measurement (or allowing a measurement to be formulated at all in the case of a strong direct signal). This also allows the inclusion of more satellites as potential sources for the range measurement as satellites (for which the direct signal has been rejected with STAP) that would normally have been in the main beam of a standard antenna can now be tracked. STAP can also utilize directional antenna elements so that if size was not a constraint, the STAP gain/directionality is in addition to directionality already obtained from the antenna elements. For a given amount of directionality, STAP can achieve it with a smaller antenna footprint (at the cost of more complicated electronics in the receiver).

(3) Jamming Issues

On the reflected antenna with STAP, the gain in directions away from the target may already be reduced by controlling the antenna pattern, so by default, jamming resistance is achieved. However, STAP processing on the direct antenna may also be used. Depending on the cost and complexity desired, anti-jamming improvements of up to 60 dB or more may be achieved. With a 60 dB anti-jamming improvement, the bi-static radar system can operate at up to 1000 times closer to a jammer, thereby allowing the user to get close enough to the target to determine its location.

Current incarnations of conventional digital receiver (STAP) technology can be modified and incorporated into a bi-static radar system. With further modifications, the STAP algorithms may be modified to operate in an environment of GPS pseudolites. One advantage to operating with pseudolites is that the increased power allows for much stronger reflections off the intended targets. Furthermore, pseudolites could be positioned so that the likelihood of a good reflection in a given area is increased as opposed to just using the reflections you get with satellites.

Figure 5:
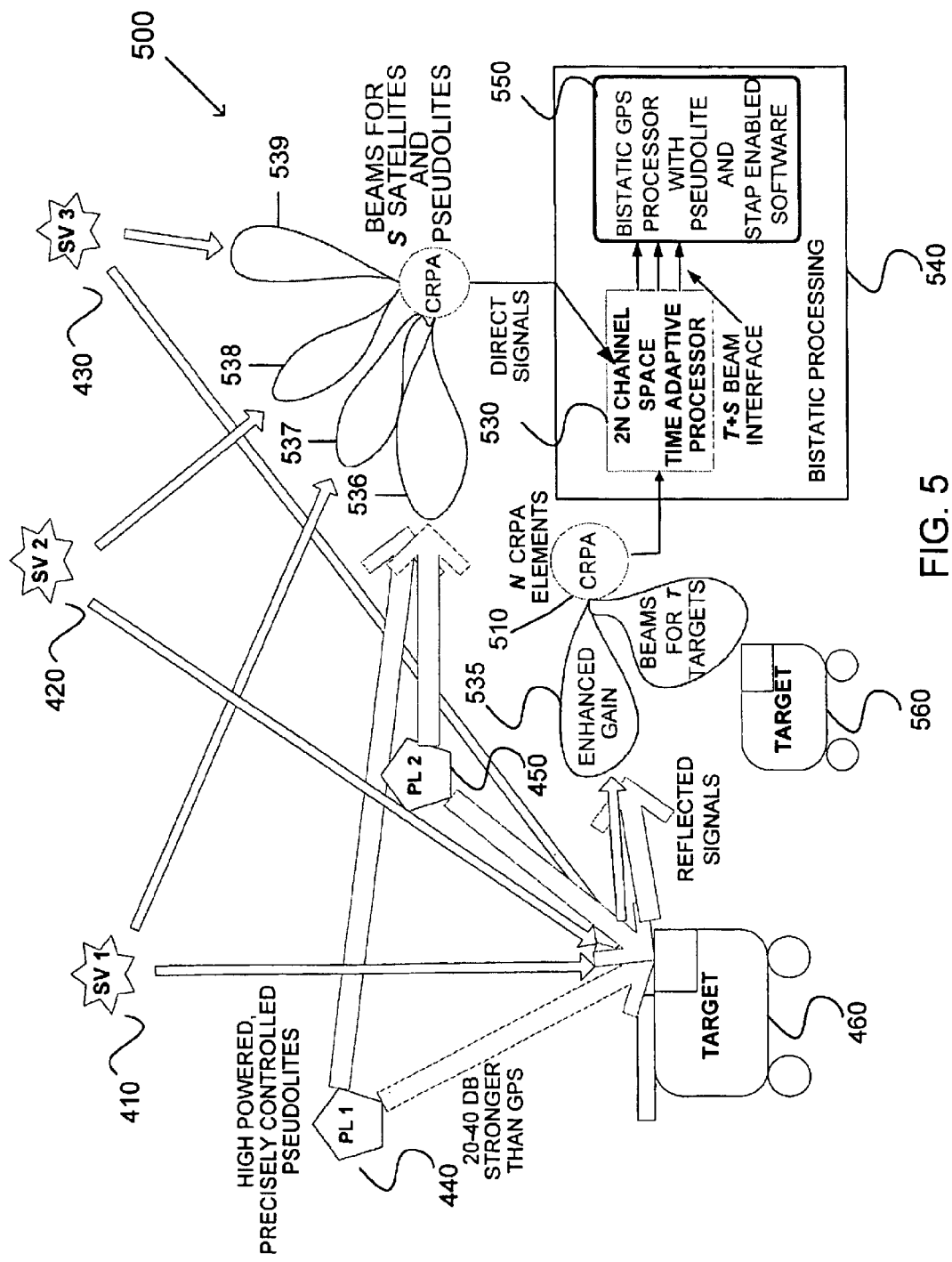
FIG. 5 is an exemplary diagram of a bi-static radar system using pseudolites and space-time adaptive processing.

Referring now to FIG. 5, a system 500 for bi-static radar using a constellation of GPS satellites 410, 420, and 430 is depicted. System 500 also includes a plurality of pseudolites 440 and 450 which may provide GPS signals at a higher power than satellites 410, 420, and 430 and also may be precisely controlled. Signals from satellites 410, 420, and 430 and pseudolites 440 and 450 bounce signals off of a target 460 such signals being directed to a controlled reception pattern antenna (CRPA) 510. Further, signals from satellites 410, 420, and 430 and from pseudolites 440 and 450 are received by a second CRPA 520. CRPA 510 and 520 allow for the reduction of multi-path issues because the antenna reception pattern may be directed towards the target. The antennas 510 and 520 provide signals to a two N channel space-time adaptive processor 530 within bi-static processing 540. The use of the STAP provides for enhanced gain 535 in the direction of the target and further in the direction 536 of the pseudolites and 537, 538, and 539 in the direction of the GPS satellites 410, 420, and 430. The use of STAP 530 provides output to a bi-static GPS processor with pseudolites and STAP enabled software 550 within bi-static processing 540 which provides the location and/or range of target 460 and further may provide the location and range of other alternative targets 560.

While the detailed drawings, specific examples and particular formulations given describe preferred and exemplary embodiments, they serve the purpose of illustration only. The inventions disclosed are not limited to the specific forms shown. The hardware and software configurations shown and described may differ depending on the chosen performance characteristics and physical characteristics of the processing devices. For example, the type of processing device, transmitter, antenna, or algorithm used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A bi-static radar system, comprising:
    a system of positioning signal transmitters transmitting positioning signals, at least one of the positioning system signal transmitters being carried on a pseudolite; and
    a receiving platform, the receiving platform having at least two antennas, a first antenna receiving positioning signals from the positioning signal transmitters, and a second antenna receiving reflected positioning signals from a target.

2. The bi-static radar system of claim 1, wherein the system of positioning signal transmitters comprises global positioning system satellites.

3. The bi-static radar system of claim 1, wherein the system of positioning signal transmitters comprises a plurality of pseudolites.

4. The bi-static radar system of claim 3, wherein at least on of the pseudolites is an aircraft.

5. The bi-static radar system of claim 3, wherein at least on of the pseudolites is a ground based platform.

6. The bi-static radar system of claim 1, wherein the receiving platform is a mobile platform.

7. The bi-static radar system of claim 1, wherein the receiving platform includes a signal processing system coupled to the at least two antennas and configured to derive a target range from the received positioning signals.

8. The bi-static radar of claim 1, wherein the positioning signals are global positioning system (GPS) signals.

9. A bi-static radar system comprising:
    a constellation of satellites having positioning signal transmitters transmitting positioning signals;
    a receiving platform, the receiving platform having at least two antennas, a first antenna receiving positioning signals form the positioning signal transmitters, and a second antenna receiving reflected positioning signals from a target; and
    a signal processing system coupled to the least two antennas, the signal processing system using a space-time adaptive processing (STAP) algorithm on the signals received by the second antenna.

10. The bi-static radar of claim 9, wherein space-time adaptive processing is used on the signals received by the first antenna.

11. The bi-static radar of claim 10, wherein the first antenna is a controlled reception pattern antenna and the STAP provides for controlling the a shape of the antenna receiving pattern.

12. The bi-static radar of claim 10, wherein anti-jamming functionality is provided by the STAP.

13. The bi-static radar of claim 9, wherein the STAP algorithm provides steering gain towards the target.

14. The bi-static radar of claim 9, wherein the second antenna is a controlled reception pattern antenna and the STAP provides for controlling the shape of the antenna receiving pattern.

15. The bi-static radar of claim 9, wherein the positioning system signals are global positioning system (GPS) signals.

16. A passive ranging system comprising:
    a system of positioning signal transmitters transmitting positioning signals, at least one of the positioning system signal transmitters being carried on a pseudolite;
    a receiving platform, the receiving platform having at least two antennas, a first antenna receiving positioning signals from the positioning signal transmitters, and a second antenna receiving reflected positioning signals from a target; and
    a signal processing system coupled to the at least two antennas, the signal processing system using space-time adaptive processing (STAP) on the signals received by the second antenna.

17. The passive ranging system of claim 16, wherein space-time adaptive processing is used on the signals received by the first antenna.

18. The passive ranging system of claim 17, wherein the fist antenna is a controlled reception pattern antenna and the STAP provides for controlling the shape of the antenna receiving pattern.

19. The passive ranging system of claim 17, wherein anti-jamming functionality is provided by the STAP.

20. The passive ranging system of claim 16, wherein the STAP provides steering gain towards the target.

21. The passive ranging system of claim 16, wherein the second antenna is a controlled reception pattern antenna and the STAP provides for controlling the antenna receiving pattern.

22. The passive ranging system of claim 16, wherein the positioning signals are global positioning system (GPS) signals.

* * * * *